(12) United States Patent
Mehl

(10) Patent No.: US 6,404,971 B2
(45) Date of Patent: Jun. 11, 2002

(54) COMPOUND FOR THE SHEATHS OF OPTICAL OR ELECTRICAL CABLES

(75) Inventor: Alfred Mehl, Georgensmund (DE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 09/880,033

(22) Filed: Jun. 14, 2001

(30) Foreign Application Priority Data

Jun. 14, 2000 (EP) ............................................ 00401675

(51) Int. Cl.⁷ .................................................. G02B 6/00
(52) U.S. Cl. ...................................................... 385/141
(58) Field of Search ......................... 385/141, 100–114; 523/173

(56) References Cited

U.S. PATENT DOCUMENTS 5,206,926 A * 4/1993 Yamamoto et al. ......... 385/143

* cited by examiner

Primary Examiner—Robert H. Kim
Assistant Examiner—Elizabeth Gemmell
(74) Attorney, Agent, or Firm—Sughrue Mion, PLLC

(57) ABSTRACT

A compound for the sheaths of optical or electrical cables, based on polyurethane with the addition of so-called fire retardants, wherein the fire retardant comprises a metal hydroxide and at least one phosphoric acid ester.

8 Claims, No Drawings

COMPOUND FOR THE SHEATHS OF OPTICAL OR ELECTRICAL CABLES

This application is based on and claims the benefit of European Patent Application No. 00401675.4 filed Jun. 14, 2000, which is incorporated by reference herein.

BACKGROUND OF THE INVENTION

The invention concerns a compound polyurethane-based for the sheaths of optical or electrical cables.

Thermoplastic polyurethane (TPU) is a material which, due to its excellent mechanical properties, is often used as a material for sheaths for cables and lines which are subject to high mechanical stresses. However, thermoplastic polyurethane does not display any fire retardant behavior. In case of fire, the polyurethane drips off of the cable or line, respectively.

Through the addition of so-called fire retardants, thermoplastic polyurethane can have its fire resistance improved enough that the cables and lines produced with it meet the necessary requirements.

Halogenated substances in combination with antimony trioxide, as well as nonhalogenated substances such as, for example, phosphoric acid esters or a combination of such esters with nitrogenous compounds, are known as fire retardants for thermoplastic polyurethanes.

Halogenated substances have the disadvantage that in case of fire, compounds are produced that are both toxic and generate corrosive gases (hydrochloric acid). Compounds which contain such fire retardants therefore do not meet the requirements in regard to the corrosiveness of gases produced in case of fire (IEC [International Electrotechnical Commission] 754-2) and freedom from halogens (VDE [Association of German Electrical Engineers] 0472/section 815).

The halogen-free fire retardants do not produce corrosive gases in case of fire, but they have the disadvantage that, if only phosphoric acid esters are used, the fire resistance is not sufficient, or, if additional nitrogenous substances are used, considerable quantities of nitrogenous, toxic compounds such as nitrogen oxides ($NO_x$) and hydrogen cyanide (HCN, prussic acid) are released.

Fire retardant silicone compositions for thermoplastics are known, e.g., from EP 0 537 013 B1, in which a fire retardant in the form of a powder, consisting of silicone oil, silicone resin, and magnesium hydroxide, all in very precise ratios to one another, is added to thermoplastics which are normally flammable. The thermoplastic can be a polyethylene, polypropylene, polycarbonate, polystyrene, polyurethane, polyamide, or another thermoplastic. The mixture can, furthermore, have salts of the phosphoric acids or, as a filler, aluminum oxide trihydrate, among other things, added to it.

The essential effect in regard to fire resistance is achieved in EP 0 537 013 B1 through the silicon oil, the silicon resin soluble in the silicon oil, and the magnesium hydroxide.

SUMMARY OF THE INVENTION

It is an object of the present invention to provide a TPU-based compound which contains neither halogenated nor nitrogenous substances and fulfills the prescriptions according to IEC 754-2 and VDE 0472/section 815.

This object is achieved by a compound wherein a metal hydroxide and at least one phosphoric acid ester are added to the compound as a fire retardant.

The compound according to the teaching of the invention meets the requirements in regard to fire resistance, corrosiveness, and freedom from halogens and, in case of fire, only generates a fraction of the toxic substances $NO_x$ and NCN which are released when the known products are used.

Further advantageous features of the invention will be apparent from the detailed description below.

DETAILED DESCRIPTION OF THE INVENTION

The invention will be described in more detail with reference to an exemplary embodiment.

A compound was produced from 100 parts polyether urethane of Shore hardness A87

18.6 parts resorcinol-bis-diphenyl phosphate 66.7 parts aluminum hydroxide and/or aluminum oxide trihydrate 0.6 parts erucic acid amide and the compound was granulated. The granulate was fed into an extruder and extruded at a temperature of 200° C. onto a cable core consisting of several insulated electrical lines stranded together.

After cooling, several samples were subjected to a fire test. No corrosive gases were released and only a small amount of toxic gases was measured.

What is claimed is:

1. A compound for the sheaths of optical or electrical cables, said compound comprising a polyurethane with the addition of a fire retardant, wherein said fire retardant comprises metal hydroxide and at least one phosphoric acid ester.

2. A compound according to claim 1, wherein said polyurethane is a polyether urethane.

3. A compound according to claim 1, wherein said metal hydroxide comprises at least one of aluminum hydroxide and aluminum oxide trihydrate.

4. A compound according to claim 1, wherein said metal hydroxide comprises magnesium hydroxide.

5. A compound according to claim 1, wherein said phosphoric acid ester is a low-volatility phosphoric acid ester.

6. A compound according to claim 1, wherein said compound contains 30 to 70 parts polyether urethane, and 25 to 60 parts aluminum hydroxide and/or aluminum oxide trihydrate.

7. A compound according to claim 6, wherein resorcinol-bis-diphenyl phosphate is used as the phosphoric acid ester.

8. An electrical cable or line with a sheath made of a compound according to claim 1, wherein the sheath is cross-linked.

* * * * *